US009235377B2

(12) United States Patent
Bhat et al.

(10) Patent No.: US 9,235,377 B2
(45) Date of Patent: Jan. 12, 2016

(54) MULTIPLE, PER SENSOR CONFIGURABLE FIFOS IN A SINGLE STATIC RANDOM ACCESS MEMORY (SRAM) STRUCTURE

(71) Applicant: Invensense, Inc., Sunnyvale, CA (US)

(72) Inventors: Vinod Bhat, San Jose, CA (US); Behrad Aria, Alameda, CA (US)

(73) Assignee: INVENSENSE, INC., San Jose, CA (US)

( * ) Notice: Subject to any disclaimer, the term of this patent is extended or adjusted under 35 U.S.C. 154(b) by 189 days.

(21) Appl. No.: 13/796,997

(22) Filed: Mar. 12, 2013

(65) Prior Publication Data

US 2014/0281341 A1    Sep. 18, 2014

(51) Int. Cl.
*G06F 5/06* (2006.01)
*G06F 12/02* (2006.01)
*G06F 12/06* (2006.01)
*G06F 5/10* (2006.01)

(52) U.S. Cl.
CPC ... *G06F 5/10* (2013.01); *G06F 5/065* (2013.01); *G06F 12/0223* (2013.01); *G06F 12/0646* (2013.01); *G06F 2205/063* (2013.01)

(58) Field of Classification Search
CPC .. G06F 5/065; G06F 12/0223; G06F 12/0646
USPC .................................. 711/171, 147, E12.002
See application file for complete search history.

(56) References Cited

U.S. PATENT DOCUMENTS

| | | | | |
|---|---|---|---|---|
| 2004/0221121 | A1* | 11/2004 | Hamilton, II | G06F 9/5016 711/170 |
| 2007/0002612 | A1* | 1/2007 | Chang | G06F 3/0608 365/185.01 |
| 2007/0268931 | A1* | 11/2007 | Shaikli | 370/468 |
| 2009/0293615 | A1* | 12/2009 | Lee | 73/514.01 |
| 2010/0306494 | A1* | 12/2010 | DeVilbiss et al. | 711/170 |
| 2014/0122800 | A1* | 5/2014 | Williams | 711/117 |

* cited by examiner

*Primary Examiner* — Edward Dudek, Jr.
(74) *Attorney, Agent, or Firm* — Maryam Imam; IPxLaw Group LLP

(57) ABSTRACT

A device includes one or more sensors, one or more processors, one or more sensors, and a memory. The memory has a first portion, a second portion, and a third portion. The first portion is allocated to storing instructions for execution by the one or more processors. The second portion is allocated to storing data generated by the one or more processor, and the third portion is allocated to storing data from the one or more sensors. The third portion being a first-in-first-out (FIFO) having one or more FIFO portions, The device further includes a control logic operable to allocate the first, second and third portions of the memory, wherein each of one or more FIFO portions is allocated to each of the one or more sensors. The size each of the FIFO portions depends on the bandwidth of the sensors and the number of sensors.

32 Claims, 4 Drawing Sheets

400

MULTIPLE, PER SENSOR CONFIGURABLE FIFOS IN A SINGLE STATIC RANDOM ACCESS MEMORY (SRAM) STRUCTURE

BACKGROUND

Various embodiments of the invention relate generally to a device using first-in-first-out (FIFOs) and particularly to configurable FIFOs.

FIFOs are common place in a variety of applications, sensors are no exception to such applications. Sensors, among other applications, often require multiple FIFOs, which increases the design area and increases power consumption. Additionally, other types of memory, such as static random access memory (SRAM) when used in conjunction with FIFOs, increases valuable memory real estate.

In sensor applications, conventional FIFOs are generally fixed in size thereby limiting their flexibility and wasting valuable memory space. For example, FIFOs used in a sensor application each correspond to a particular sensor and a fixed FIFO size fails to allow for the size of the FIFO to change and correspond to the requirements of an associated sensor.

There is thus a need for a configurable FIFO and a method and apparatus for using the same.

SUMMARY

Briefly, a device includes one or more sensors, one or more processors coupled to the one or more sensors, and a memory coupled to the one or more sensors and the one or more processors. The memory has a first portion, a second portion, and a third portion, the third portion being a first-in-first-out (FIFO) having one or more FIFO portions. The first portion of memory is allocated to store instructions for execution by a processor of the one or more processors. The second portion is allocated to store data generated by the processor, and the third portion is allocated to store data from the one or more sensors. The device further includes a control logic coupled to the memory and operable to allocate the first, second and third portions of the memory, wherein each of one or more FIFO portions of the third portion of memory is allocated to each of the one or more sensors.

A further understanding of the nature and the advantages of particular embodiments disclosed herein may be realized by reference of the remaining portions of the specification and the attached drawings.

DETAILED DESCRIPTION OF EMBODIMENTS

The following describes a device using multiple configurable FIFOs. The multiple configurable FIFOs may be a single FIFO with multiple portions with each portion re-sized to fit the application in which the FIFOs are employed or multiple configurable FIFOs with each FIFO re-sized to fit the application in which the FIFOs are employed. Further, each FIFO or FIFO portion is configured to be accessed by multiple consumers, as discussed below. In the described embodiments, "consumers" refer to users of FIFOs, namely devices that read the contents (also referred to as "data") of a FIFO and "producers" refer to devices or users that write data to or program the FIFO.

Figure 1:
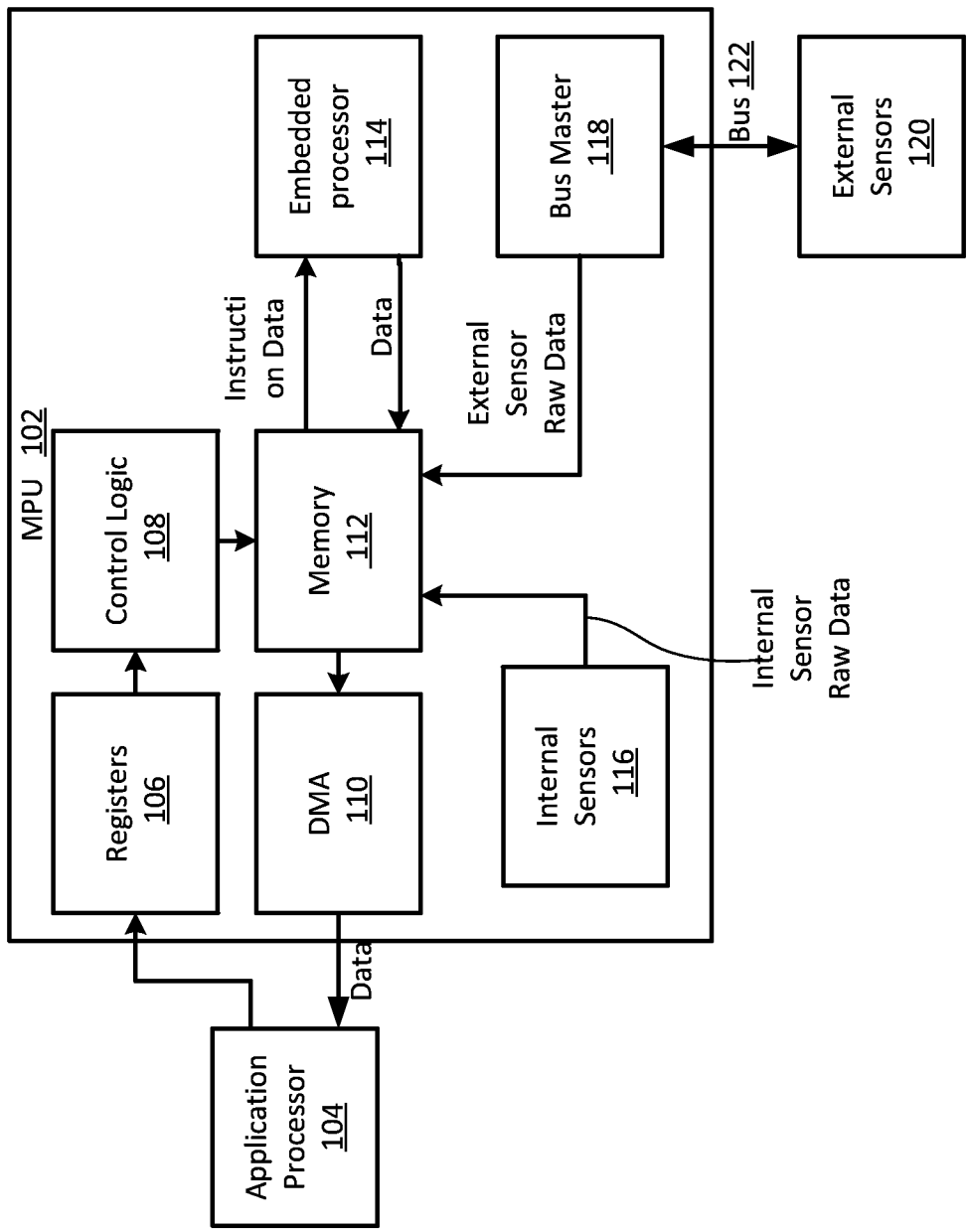
FIG. 1 shows a system 100 to include an application processor, a device, motion processing unit (MPU), and external sensors, in accordance with an embodiment of the invention.

Referring now to FIG. 1, a system 100 is shown to include an application processor 104, a motion processing unit (MPU) 102, and external sensors 120, in accordance with an embodiment of the invention. The MPU 102 is shown coupled to the external sensors 120 through a bus and is further shown to send "data" to the application processor 104 and to receive information from the application processor 104.

The MPU 102 is shown to include registers 106, control logic 108, direct memory access (DMA) 110, memory 112, internal sensors 116, embedded processor 114, and a bus master 118. The MPU 102 is shown coupled to the bus 122 and the external sensors 120 through the bus master 118.

The components of the MPU 102 can include MEMS sensors and electronic circuit. In an embodiment, the sensors can include MEMS accelerometers, gyroscope, magnetometer and pressure sensors. Some embodiments include an accelerometer, a gyroscope, and a magnetometer, each providing a measurement along three axis orthogonal to each other. Other embodiments may not include all the sensors or may provide measurements along one or more axis. The sensors are formed on a first substrate.

In an embodiment, the electronic circuit receives the measurement outputs, stores the raw data, and processes the raw data to generate motion data, apart from other operations. The operations are performed by register 106, control logic 108, DMA 110, memory 112, embedded processor 114, and bus master 118. The electronic circuit is implemented on a second silicon substrate. The first substrate is vertically bonded to the second substrate. In the described embodiments, "raw data" refers to the measurement outputs of the sensors and "motion data" refers to the processed raw data.

In an embodiment, the electronic circuit receives the measurement outputs, store the raw data process the raw data to generate motion data apart from other operations. The operations are performed by register 106, control logic 108, DMA 110, memory 112, embedded processor 114, bus master 118. The electronic circuit is implemented on a second silicon substrate. The first substrate is vertically bonded to the second substrate. In the described embodiments, raw data refers to the measurement outputs of the sensors and motion data refers to the processed raw data.

In one embodiment, MPU 102 is implemented by vertically stacking and bonding the MEMS sensors on the first substrate to the electronic circuit on the second substrate using wafer-scale bonding processes as described in commonly owned U.S. Pat. No. 7,104,129 (incorporated by reference above) that simultaneously provides electrical connections and hermetically seals the MEMS devices. This unique and novel fabrication technique is the key enabling technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The DMA 110 sends data to the application processor 104 and receives data from the memory 112. The registers 106 receive information from the application processor 104 and in turn, provide information to the control logic 108, which are shown coupled to the memory 112. Further coupled to the memory 112 is shown the embedded processor 114. Embedded processor 114 transmits data to the memory 112 and receives instructions or data from the memory 112. Bus master 118 sends raw data received from the external sensors 120 to memory 112. The internal sensors 116 provide raw data to the memory 112. Accordingly, raw data from the internal sensors 116 and the external sensors 120 is transferred to and saved in the memory 112. "Internal sensors", as used herein, refers to sensors that are formed on the same semiconductor or integrated circuit (IC) chip as the rest of the components of MPU 102. "External sensors", as used herein, refers to the sensors that are located externally to the MPU 102. In the described embodiments, internal sensors can be MEMS devices, solid state sensors or any other type of sensors. Example of sensors are accelerometer, gyroscopes, pressure sensors, magnetometer, and microphone.

In sensor applications, information transferred from the embedded processor 114 to the memory 112 is motion data. As will be further evident shortly, the instruction program as well as the embedded processor data are saved in the memory 112.

The application processor 104 resides externally to the MPU 102 and is generally a separate processor dedicated to an application employing the MPU 102 and the external sensors. Data is transferred to and from the application processor 104, by the MPU 102, through the DMA 110. In an embodiment, registers 106 store sensor and memory configuration information. Exemplary information, without limitation, that is stored in the registers 106 is static override size of the FIFOs, the minimum size of data and instruction memory, the output data rates of sensors, and the size of data packets of each sensor, such as the sensors 116 and 120 of the embodiment of FIG. 1.

The control logic 108 controls the manner in which memory is allocated for the various sensors employed, such as the sensors 120 and 116, and the embedded processor 114. The control logic 108 further controls the pointers to the FIFOs. The FIFOs are a part of the memory 112. In addition to pointer management as a part of its function, the control logic 108 allocates the minimum size of the data and instruction memory for the embedded processor 114, flexibly sizes the FIFO portion, dynamically reallocates memory (or FIFOs) when the FIFO portion is modified, determines the number of portions in which to divide the FIFO portion and the size of each FIFO portion. It is noted that "FIFO portion" and "FIFO" or "FIFO portions" and "FIFOs" are used synonymously herein.

During operation, raw data is received by the memory 112 from the sensors 116 and 120 and stored in a dedicated FIFO or FIFO portion for processing by the embedded processor 114 and ultimately used by the application processor 104.

Figure 2:
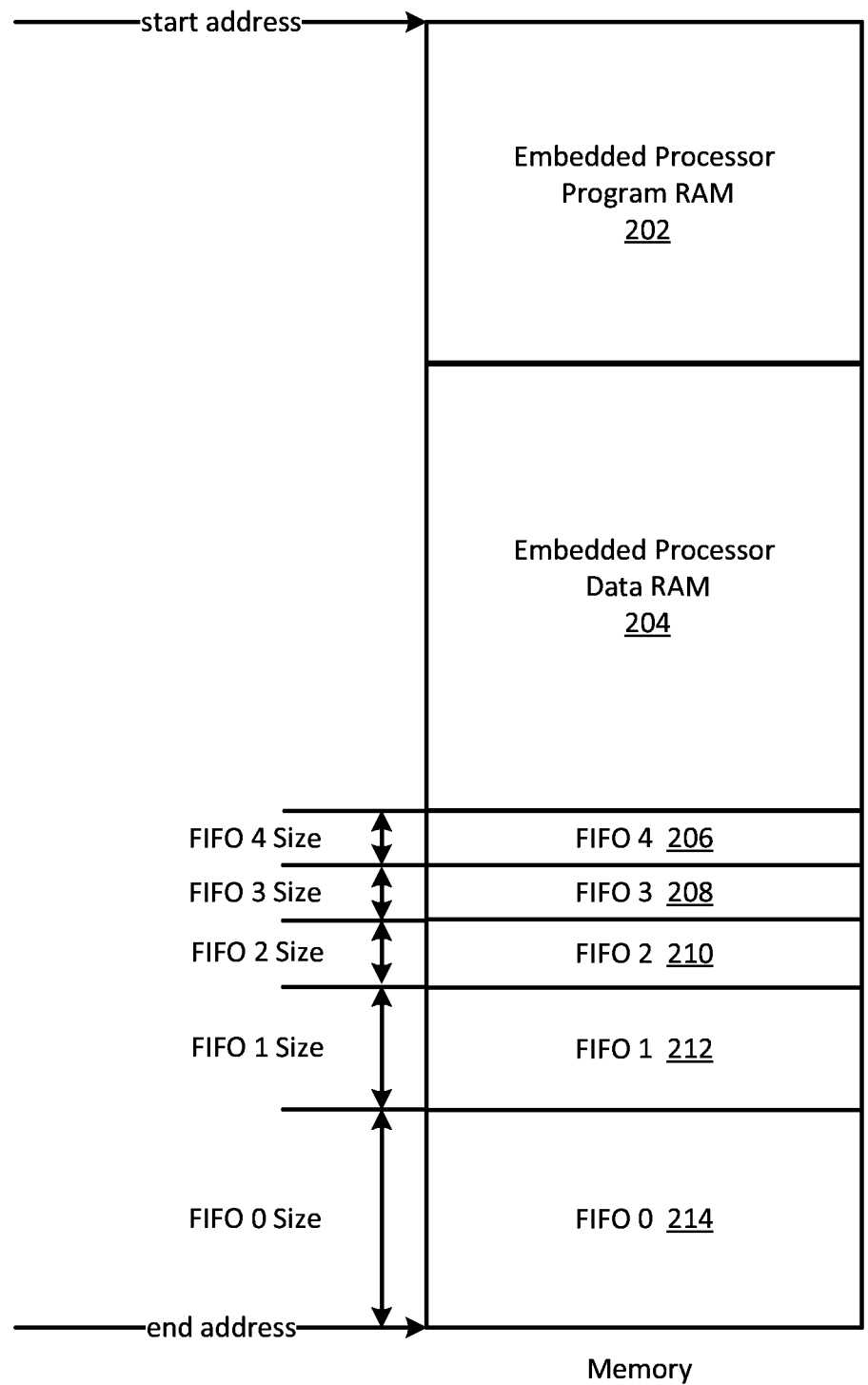
FIG. 2 shows exemplary contents of the memory of FIG. 1.

FIG. 2 shows exemplary contents of the memory 112 of FIG. 1. The memory 112 is shown as the memory 200 in FIG. 2 and includes an embedded processor program random access memory (RAM) 202, an embedded processor data RAM 204, and five FIFOs—FIFOs 206 to 214. In other embodiments, memory 200 can have any number of FIFOs. The program RAM 202 and the data RAM 204 are generally for use by the embedded processor 114 in that a program, saved in the RAM 202, is executed by the embedded processor 114 and in the process of execution, data from the data RAM 204 is utilized by the embedded processor 114.

As shown in the embodiment of FIG. 2, each of the FIFOs 206-214 has a distinct size. The FIFOs 206-214 are also referred to herein as "FIFO portions" because they may alternatively be a part of a single FIFO. The RAMs 202 and 204 are advantageously formed on the same semiconductor (or IC) as the multiple FIFOs.

In some embodiments, the size of each of the FIFOs 206-214 is the same. In some of the embodiments the size of some of the FIFOs 206-214 is the same. In some embodiments, the size of each of the FIFOs 206-214 is unique.

The memory 200 has a start address pointer and an end address pointer, both of which are controlled by the control logic 108. Further, as will be shown in greater detail shortly, each of the FIFOs 206-214 has pointers controlled by the control logic 108.

In summary, the memory 200 shows an example of the memory partitioned into five FIFOs, i.e. FIFO 206-214, and instruction program, i.e. program RAM 202, and DATA RAM 204 for use for the embedded processor 114. Distinct sizing is shown for each FIFO, in FIG. 2, and advantageously the entire memory structure is utilized. This is accomplished due to the configurable FIFOs 206-214. That is, the number of FIFOs is dynamically allocated based on the number of sensors enabled. By way of example, if a sensor is disabled, the FIFO space for that sensor is freed up and allocated to the data portion of the memory for the embedded processor 114. Disabling a sensor refers to the sensor being either turned off or in a low power state where the sensor does not transmit any data. Enabling a sensor refers to the sensor being on or in a non-lower power state where the sensor is able to transmit data.

Figure 3:
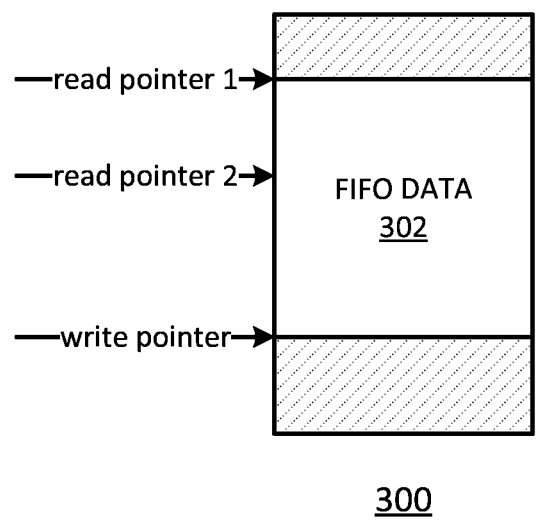
FIG. 3 shows a memory 300 including an exemplary FIFO or FIFO portion, in accordance with an embodiment of the invention.
Figure 4:
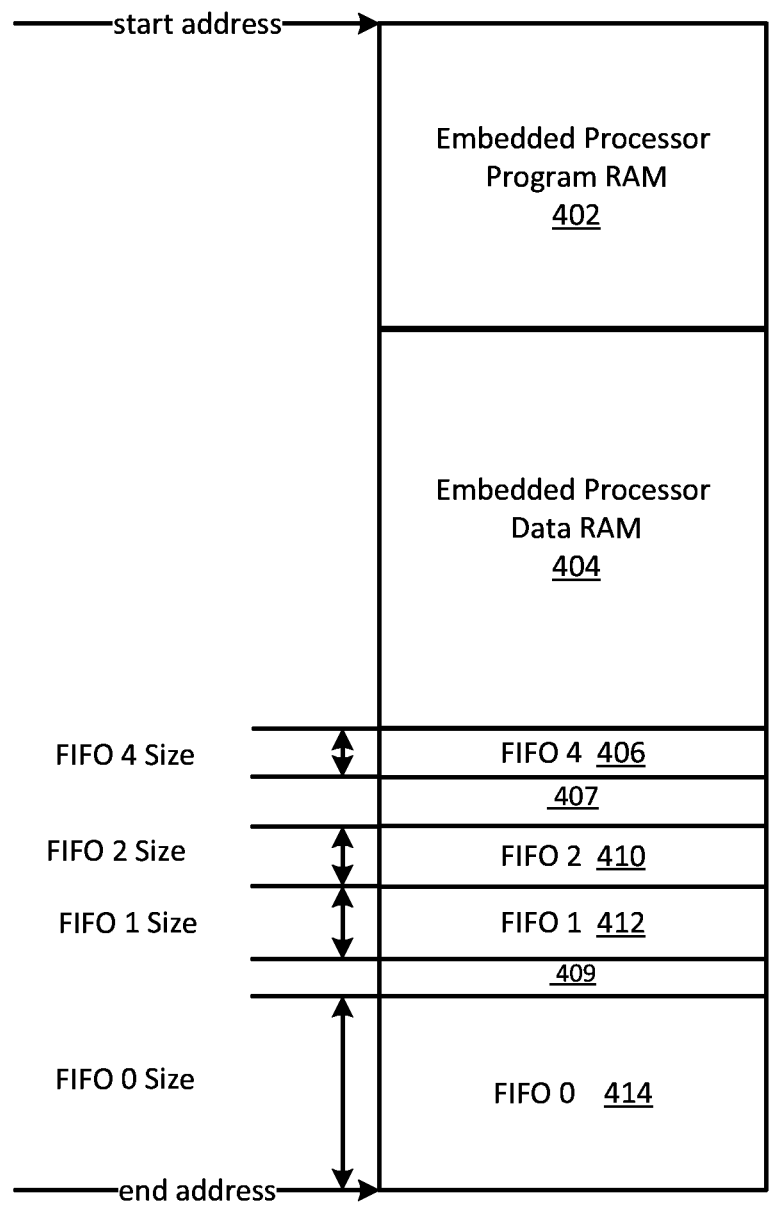
FIG. 4 shows a memory 400 including multiple FIFOs, in accordance with another embodiment of the invention.

The control logic 108 of the embodiment of FIG. 1 sizes each of the FIFOs of the embodiments of FIGS. 3 and 4 in accordance with the following steps. During initial power-on of the device 102, the control logic 108 allocates the minimum memory size for the program RAM 202 and data RAM 204. The minimum size of the required memory for program RAM 202 and data RAM 204 is specified in the registers 106. The control logic 108, next, allocates memory for FIFOs, such as the memory shown to be reserved for the FIFOs 206-214 in FIG. 2. In the case where the FIFOs are employed in a device using sensors, the number of FIFOs assigned is generally equal to the number of enabled sensors. Each sensor advantageously has a dedicated FIFO in memory. The size of each FIFO is calculated by the control logic 108 based on the data rates or bandwidth of corresponding sensors. Typically, the higher the data rate of a sensor, the larger the size of the FIFO size being allocated to that sensor. In some embodiments, the raw data is made of packets and the size of each of the FIFOs or FIFO portions is a multiple of the size of a data packet. In such embodiments, the granularity of the FIFO size is the minimum packet size of the sensor i.e. the FIFO size is an integer multiple of the packet size of the sensor.

In some embodiments, the control logic 108 allows for an entire packet to be written into a FIFO only if there is enough space in the FIFO for an entire packet. This advantageously substantially guarantees that data packets are stored in their entirety in the FIFO and also the locations of the data packets in the FIFO are at fixed offsets in the FIFO relative to each other, which makes for easier access of the data packets in the FIFO from the embedded processor and application processor.

Start and end addresses for each of the FIFOs are maintained by the control logic 108. The start and end address of each of the FIFOs effectively determines the size of the FIFO.

The memory or area of FIFO or FIFO portion that is not allocated to the minimum size of RAM 202 or minimum size of data RAM and/or to the FIFO is allocated to the RAM 204 for the embedded processor data 114.

In some embodiments, the sizes calculated by the control logic 108 can be overridden by sizes explicitly defined in the registers 106. That is, initially, sizes of FIFOs are predetermined and saved in the registers 106 and subsequently, these sizes may be adjusted or re-configured by the control logic 108 to better fit the requirements of the particular application.

Among other attributes, the memory 200 has a smaller design area than that of prior art memories due to the use of multiple FIFOs or multiple FIFO portions because a single SRAM is used for multiple FIFOs instead of use of a SRAM for each FIFO, which clearly results in a larger area. Smaller area advantageously results in reduced power consumption. Moreover, use of the SRAM size is optimized. Additionally, each FIFO can be sized proportionally to the data rate being written to the FIFO. For example, the rate of a sensor defines, at least in part, the size of the FIFO, which is configurable.

FIG. 3 shows a memory 300 including an exemplary FIFO or FIFO portion, in accordance with an embodiment of the invention. The FIFO 300 may be any one of the FIFOs 206-214 of the embodiment of FIG. 2 and stores data 302. The FIFO 300 is shown to have three pointers, read pointer 1, read pointer 2, and a single write pointer. While two read pointers are shown in FIG. 3, any number of read pointers may be employed.

The FIFO (or FIFO portion) 300 is a single FIFO having one write pointer and two read pointers. This structure allows for data to be written by one client (or "producer") and read by two independent clients (or "consumers"), such as the embedded processor 114 and the application processor 104. Data between the read and write pointers is valid FIFO data. New data is written to the FIFO at the location pointed to by a corresponding write pointer and the write pointer advances, increments by the number of entries in the data packet, as long as the write pointer does not cross the read pointer. The FIFO 300 is a circular type of FIFO.

Regarding pointer management of the FIFO 300, the following is noted. As discussed above, the FIFO 300 can have multiple read pointers from multiple independent FIFO data consumers but only has a single write pointer from a single FIFO data producer. Data to the FIFO 300 is written to a location identified by the FIFO address that is stored in the registers 106 or the control logic 108, as the write pointer. Data from the FIFO 300 to a consumer is read from a FIFO address that is stored in the consumer's read pointer, in the registers 106 or the control logic 108. The read pointer to the FIFO 300, i.e. data consumer, advances (or increments) by a single address for each data read by that consumer. Advancing of the FIFO read and write pointers is generally performed by the control logic 108. The write pointer from the FIFO data producer advances by a single address for each data write by the producer.

Each FIFO data consumer has an empty and a full status. Empty status of a consumer is set when a FIFO is reset or when the read pointer to the consumer advances and its value equals the value of the write pointer. Full status of a consumer is set when the write pointer advances and its value equals the value of the read pointer to the consumer. Additionally, multiple data consumers can access the same FIFO or FIFO portion.

The FIFO data consumers can be configured to be blocking or non-blocking. In cases where a FIFO (such as the FIFO 300) data consumer is configured to be blocking, the FIFO's corresponding read pointer blocks the write pointer to the FIFO i.e. the write pointer cannot advance beyond where the read point points to. The FIFO is said to be full at this point and any additional writes when the FIFO is full are dropped.

When a FIFO (such as the FIFO 300) data consumer is configured to be non-blocking, its read pointer does not block the write pointer. In cases where the FIFO is full and the write pointer matches the read pointer of a non-blocking consumer and there is an additional write to the FIFO, both write and read pointers of the FIFO advance and the additional data is written to the FIFO.

FIG. 4 shows a memory 400 including multiple FIFOs, in accordance with another embodiment of the invention. The memory 400 is the same as the memory 300 after the FIFO 1 212 has been decreased in size and the FIFO 3 208 has been removed in its entirety. The freed space 407 due to removal of FIFO 1 and 409 due to decrease in size of FIFO 1 is allocated for Embedded Processor data RAM 404, thus making full use of the SRAM. The read and write pointers for the resized FIFO 1 are reset. The read and write pointers of the FIFO 0, FIFO 2, and FIFO 4 are unaffected by this operation In the case where a FIFO is increased in size or a new FIFO is added as yet another FIFO or FIFO portion, the start and end addresses for all the FIFOs are recalculated but data integrity for an FIFO is not guaranteed as the start address of all the FIFOs in the memory 400 or 300 or 112 might change from that which it was previously.

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A device comprising:
   one or more sensors, each having a bandwidth associated therewith;
   one or more processors;
   a memory coupled to the one or more sensors and the one or more processors and having a first portion, a second portion, and a third portion, the first, second, and third portions being contiguous, the third portion being a first-in-first-out (FIFO) having one or more FIFO portions, the first portion allocated to store instructions for execution by a processor of the one or more processors, the second portion allocated to store data generated by the processor, and the third portion allocated to store data from the one or more sensors wherein the sizes of the first, second and third portions of the memory are based on the bandwidth of the one or more sensors; and
   control logic coupled to the memory and operable to dynamically allocate the first, second and third portions of the memory,
   wherein each of one or more FIFO portions is allocated to each of the one or more sensors.

2. The device of claim 1, wherein each of the sizes of the first, second, and third portions are dynamically allocated.

3. The device of claim 2, further including registers coupled to the control logic and the registers configured to store the size of the first, second and third portions for static override of the dynamically allocated sizes.

4. The device of claim 1, wherein the sizes of the one or more FIFO portions of the third portion of the memory are based on the number of the one or more sensors.

5. The device of claim 1, wherein the sizes of the one or more FIFO portions of the third portion of the memory are based on the bandwidth of the one or more sensors.

6. The device of claim 5, wherein the sizes of the one or more FIFO portions of the third portion of the memory are based on the number of the one or more sensors.

7. The device of claim 1, wherein the control logic is operable to dynamically allocate a minimum size of the first portion and a minimum size of second portion before allocating a size for the third portion of the memory.

8. The device of claim 7, wherein the control logic includes a register to store the minimum size of the first portion and the minimum size of the second portion.

9. The device of claim 7, wherein the control logic is operable to dynamically resize the second portion when the size of the third portion of the memory changes.

10. The device of claim 1, wherein the control logic determines the number of the one or more FIFO portions of the third portion memory depending on the number of one or more sensors enabled.

11. The device of claim 1, wherein the third portion includes one or more FIFO portions and the control logic is operable to determine the size of each of the one or more FIFO portions of the third portion based on an expected data rate of the one or more sensors.

12. The device of claim 1, wherein each of the one or more FIFO portions of the third portion further comprises one or more read pointers and a write pointer.

13. The device of claim 1, wherein each of the one or more FIFO portions of the third portion is simultaneously read by the one or more processors.

14. The device of claim 1, wherein each of the one or more FIFO portions of the third portion is written by each enabled one or more sensors.

15. The device of claim 1, wherein each of the one or more FIFO portions has a plurality of read pointers from a plurality of FIFO data consumers and a write pointer from a data producer.

16. The device of claim 15, wherein the write pointer is used to identify a FIFO address of one of the one or more FIFO portions to which data is written.

17. The device of claim 15, wherein data from the one or more FIFO portions is read from a location of one of the one or more FIFO portions identified by a corresponding one of the plurality of read pointers.

18. The device of claim 15, wherein each of the plurality of read pointers advances by a size of data packet for each data read by a consumer.

19. The device of claim 15, wherein the write pointer advances by a size of data packet each time data is written to one of the one or more FIFO portions by the data producer.

20. The device of claim 15, wherein each of the plurality of FIFO data consumers has an associated empty status and a full status.

21. The device of claim 20, wherein the empty status of a consumer of the plurality of data consumers is set when the one or more FIFO portions is reset or when the read pointer to the consumer advances and has a value equal to the value of the write pointer.

22. The device of claim 20, wherein the full status of a consumer of the plurality of the data consumers is set when the write pointer advances and has a value equal to the value of the read pointer to the consumer.

23. The device of claim 15, wherein each of the plurality of data consumers is configured to be blocking or non-blocking.

24. The device of claim 23, wherein when a consumer of the plurality of data consumers is configured to be blocking, a read pointer associated with the consumer blocks being configured to prevent the write pointer from advancing beyond a location to which the read pointer pointing.

25. The device of claim 24, wherein block of the write pointer causes additional writes to the one or more FIFO portions to be dropped.

26. The device of claim 24, wherein when a consumer of the plurality of data consumers is configured to be non-blocking, the read pointer associated with the consumer is configured to block the write pointer.

27. The device of claim 26, wherein when the one or more FIFO portions is full and the write pointer matches the read pointer associated with a non-blocking consumer, an additional data write is performed to the one or more FIFO portions and the write and read pointers are configured to advance and the additional data is written to the one or more FIFO portions.

28. The device of claim 1, wherein the data is made of data packets, further wherein, the size of each of the one or more FIFO portions is a multiple of the size of a data packet.

29. The device of claim 1, wherein the one or more FIFO portions being contiguous.

30. The device of claim 1, wherein the first, second, or third portions are re-sized.

31. The device of claim 30, wherein the first, second, and third portions remain contiguous even upon one of the first, second, or third portions being re-sized.

32. The device of claim 30, wherein upon re-sizing, the control logic being operable to cause moving at least one of the first, second and third portions not being re-sized to a location in the memory contiguous with the first, second, or third portion being re-sized.

* * * * *